US012560315B2

(12) United States Patent

Deng et al.

(10) Patent No.: US 12,560,315 B2

(45) Date of Patent: Feb. 24, 2026

(54) TRANSPARENT SCREEN

(71) Applicant: ROE VISUAL CO LTD, Shenzhen City (CN)

(72) Inventors: Shengyun Deng, Shenzhen City (CN); Hua Zhong, Shenzhen City (CN); Lisheng Dai, Shenzhen City (CN); Zhichun Tian, Shenzhen City (CN); Lei Chen, Shenzhen City (CN)

(73) Assignee: ROE VISUAL CO LTD, Shenzhen City (CN)

( * ) Notice: Subject to any disclaimer, the term of this patent is extended or adjusted under 35 U.S.C. 154(b) by 0 days.

(21) Appl. No.: 19/032,913

(22) Filed: Jan. 21, 2025

(65) Prior Publication Data

US 2025/0243999 A1 Jul. 31, 2025

(30) Foreign Application Priority Data

Jan. 27, 2024 (CN) ......................... 202420224769.0

(51) Int. Cl.

*F21V 23/00* (2015.01)
*F21K 9/60* (2016.01)
*F21V 17/10* (2006.01)
*F21V 23/06* (2006.01)
*F21Y 115/10* (2016.01)

(52) U.S. Cl.

CPC .............. *F21V 23/005* (2013.01); *F21K 9/60* (2016.08); *F21V 17/101* (2013.01); *F21V 23/06* (2013.01); *F21Y 2115/10* (2016.08)

(58) Field of Classification Search

CPC .... F21Y 2115/10; F21V 23/06; F21V 17/101; F21K 9/60; H01R 12/7076; H01R 12/50–585

See application file for complete search history.

(56) References Cited

FOREIGN PATENT DOCUMENTS

| | | | | |
|---|---|---|---|---|
| CN | 204667813 U | | 9/2015 | |
| CN | 109166468 A | * | 1/2019 | ............... G09F 9/33 |
| CN | 208477858 U | | 2/2019 | |
| CN | 212365403 U | | 1/2021 | |
| CN | 213400355 U | | 6/2021 | |
| CN | 213988107 U | | 8/2021 | |
| CN | 215643496 U | * | 1/2022 | |

(Continued)

OTHER PUBLICATIONS

Innovation Q+ PL Search (Year: 2025).*

(Continued)

*Primary Examiner* — Anabel Ton

(74) *Attorney, Agent, or Firm* — Maschoff Brennan

(57) ABSTRACT

The present application discloses a transparent screen, including a first circuit board, an LED lamp bead and a plurality of first connecting columns. The first circuit board has a first surface and a second surface opposite to the first surface; the first circuit board includes a transparent portion provided with several first through holes and a mounting portion without through holes, and the LED lamp bead is mounted on the mounting portion of the first surface; and a first connecting column, mounted on the mounting portion of the second surface; where the first connecting column has a first limiting protrusion. The first connecting column is mounted on the mounting portion of the second surface which does not affect the transparency of the transparent screen.

19 Claims, 7 Drawing Sheets

(56) References Cited

FOREIGN PATENT DOCUMENTS

| | | | | |
|---|---|---|---|---|
| CN | 114973977 | A | 8/2022 | |
| CN | 217640568 | U | 10/2022 | |
| CN | 117037632 | A | 11/2023 | |
| CN | 222233223 | U | 12/2024 | |
| DE | 102012213046 | B4 * | 7/2024 | ............... F21K 9/00 |
| JP | 2022525819 | A | 5/2022 | |

OTHER PUBLICATIONS

European Search Report dated May 19, 2025 as received in application No. 25152243.9.

Japanese Office Action dated Aug. 6, 2025 as received in application No. 2025-006327.

GB Search and Examination Report dated May 30, 2025 as received in application No. 2500950.7.

* cited by examiner

TRANSPARENT SCREEN

CROSS-REFERENCE TO RELATED APPLICATIONS

The present application refers to Chinese Patent Application No. 202420224769.0, filed on Jan. 27, 2024, and entitled "Transparent Screen", which is hereby incorporated by reference in its entirety.

TECHNICAL FIELD

The present application relates to the technical field of display screen, and more particularly, to a transparent screen.

BACKGROUND

With the continuous development of display technology, LED transparent screens came into being. As a kind of LED display screen, LED transparent screens have the characteristics of high transparency and ultra-lightness. Compared with traditional non-transparent LED display screens, LED transparent screens can not only be integrated with the building, but also have less impact on indoor lighting, and the safety and reliability of installation are relatively high. In recent years, LED transparent screens have been used more and more widely in the field of architectural media. In addition, LED transparent screens can also be mounted in glass windows and used in scenes such as window displays.

When the LED transparent screens are in use, usually multiple LED transparent screens are spliced into one large display apparatus. After the existing LED transparent screens are spliced, the connection between two adjacent LED transparent screens has poor transparency, which affects the overall display effect.

SUMMARY

The problem to be solved by the present application is that after the existing LED transparent screens are spliced, the connection between two adjacent LED transparent screens has a poor transparency, which affects the overall display effect.

The technical solution adopted by the present application is as follows:

A transparent screen, including:

- a first circuit board and an LED lamp bead, where the first circuit board has a first surface and a second surface opposite to the first surface; the first circuit board comprises a transparent portion provided with several first through holes and a mounting portion without through holes, and the LED lamp bead is mounted on the mounting portion of the first surface; and
- a plurality of first connecting columns, mounted on the mounting portion of the second surface; wherein the first connecting column has a first limiting protrusion.

Furthermore, the first connecting column is mounted at a left end and/or a right end of the first circuit board.

Furthermore, the transparent screen further includes a first limiting plate, the first limiting plate is provided with a first mounting hole, the first connecting column is inserted into the first mounting hole, and the first limiting protrusion abuts against the first limiting plate; and the first limiting plate is provided with a second through hole, and the second through hole corresponds to the first through hole.

Furthermore, the transparent screen further includes a plurality of second connecting columns, the second connecting column is mounted on the mounting portion of the second surface; some of the second connecting columns transmit electrical energy, and some of the second connecting columns transmit signal; and the second connecting column has a second limiting protrusion.

Furthermore, the second connecting column and the first connecting column are provided alternatively in column.

Furthermore, the first connecting column and the second connecting column are provided at a lower end of the first circuit board;

- the transparent screen further includes a second circuit board, one end of the second circuit board is welded to the first circuit board, and one end of the second circuit board extends outside the first circuit board; the second circuit board is electrical and signal conductive with the first circuit board; the second circuit board is provided with a third through hole, and the third through hole corresponds to the first through hole; the second circuit board is provided with a second accommodating hole and a third mounting hole, and the first connecting column is able to be inserted into the second accommodating hole; and the second connecting column is able to be inserted into the third mounting hole, and the second limiting protrusion abuts against the second circuit board.

Furthermore, the first connecting column and the second connecting column are provided at an upper end and/or a lower end of the first circuit board;

- the transparent screen further comprises a second circuit board, the second circuit board is provided with a third through hole, and the third through hole corresponds to the first through hole; the second circuit board is provided with a second accommodating hole and a third mounting hole, and the first connecting column is able to be inserted into the second accommodating hole; and the second connecting column is able to be inserted into the third mounting hole, and the second limiting protrusion abuts against the second circuit board.

Furthermore, the transparent screen further includes a second limiting plate, the second limiting plate is provided with a fourth through hole, and the fourth through hole corresponds to the first through hole; the second limiting plate is provided with a fourth mounting hole and a fifth accommodating hole, the first connecting column passes through the third mounting hole and extends into the fourth mounting hole, and the first limiting protrusion abuts against the second limiting plate; and the fifth accommodating hole corresponds to the second connecting column.

Furthermore, the first connecting column is mounted on an upper end or/and a lower end of the first circuit board; some of the first connecting columns transmit electrical energy, and some of the first connecting columns transmit signal;

- the transparent screen further includes a second circuit board, the second circuit board is provided with a third through hole, and the third through hole corresponds to the first through hole;
- the second circuit board is provided with a second accommodating hole, the first connecting column is inserted into the second accommodating hole, and the first limiting protrusion abuts against the second circuit board, to realize the transmission of electric energy and signal between the first circuit board and the second circuit board.

Furthermore, the first connecting column is provided with an annular groove, and an upper side wall of the groove is the first limiting protrusion.

Furthermore, the first mounting hole is a T-shaped hole, and an aperture near one end of the first circuit board is smaller than an aperture away from the first circuit board.

Furthermore, the first limiting plate is provided at a joint of the second surface of two identical first circuit boards being provided left and right, the second through hole corresponds to a position of the first through hole, and an aperture of the second through hole is not less than an aperture of the first through hole.

Furthermore, the first connecting column is a copper column, being welded and fixed with the first circuit board; and the second connecting column is a pogopin spring needle.

Furthermore, the second surface of the first circuit board is provided with a carbon fiber plate, and the carbon fiber plate is provided with a hole corresponding to the first through hole; the carbon fiber plate is provided with an accommodating groove at a position welding the first circuit board and the second circuit board.

In summary, the present application has the beneficial effect:

- the first connecting column is mounted on the mounting portion of the second surface and does not affect the transparency of the transparent screen.

DETAILED DESCRIPTION OF EXAMPLE EMBODIMENTS

In order to make the above purposes, features and advantages of the present application more obvious and understandable, the specific embodiments of the present application are described in detail in combination with the drawings. Many specific details are set forth in the following description to facilitate a full understanding of the present application. However, the present application can be implemented in many other ways different from those described herein, and persons skilled in the art may make similar improvements without contravening the connotation of the present application, and therefore the present application is not subject to the specific implementation disclosed below.

It should be noted that when an element is referred to as being “fixed to” another element, it may be directly on the other element or there may be an intermediate element. When an element is considered to be “connected to” another element, it may be directly connected to the other element or there may be an intermediate element at the same time.

Unless otherwise defined, all technical and scientific terms used herein have the same meaning as commonly understood by one of ordinary skill in the art to which this the present application belongs. The terms used in the description of the present application are only for the purpose of describing specific embodiments and are not intended to limit the present application. As used herein, the term “and/or” includes any and all combinations of one or more of the associated listed items.

Figure 5:
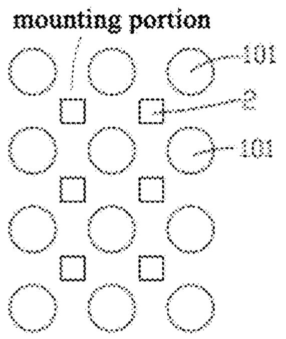
FIG. 5 is a schematic diagram of an LED lamp bead.
Figure 6:
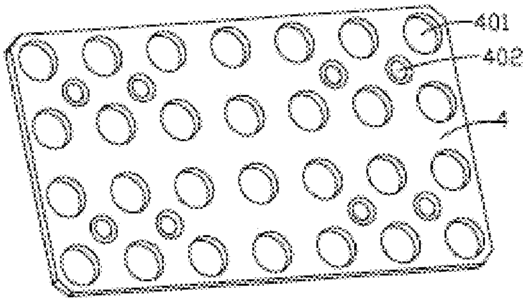
FIG. 6 is a schematic diagram of a first limiting plate.

A transparent screen, includes a first circuit board 1, an LED lamp bead 2 and a plurality of first connecting columns 3, the first circuit board 1 has a first surface and a second surface opposite to the first surface; the first circuit board 1 includes a transparent portion with several first through holes 101 and a mounting portion without through holes, and the first through holes 101 penetrate the first surface and the second surface. The LED lamp bead 2 is mounted on the mounting portion of the first surface. In some embodiments, the first through holes 101 are provided in an array, and the LED lamp bead 2 is also arranged in an array on the first circuit board 1. In some embodiments, the LED lamp bead 2 is surrounded by four first through holes 101 (see FIG. 5). The first connecting column 3 is mounted on the mounting portion of the second surface, and the first connecting column 3 has a first limiting protrusion 301. The first connecting column 3 is mounted on the mounting portion of the second surface, which will not affect the transparency of the transparent screen.

Figure 1:
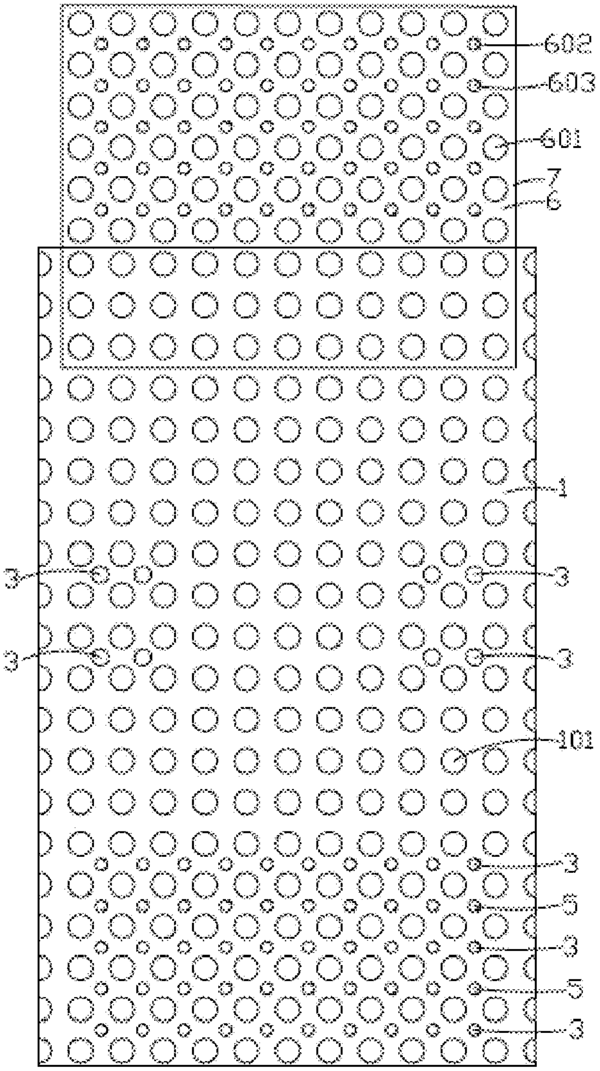
FIG. 1 is a schematic diagram of an embodiment of a transparent screen.
Figure 2:
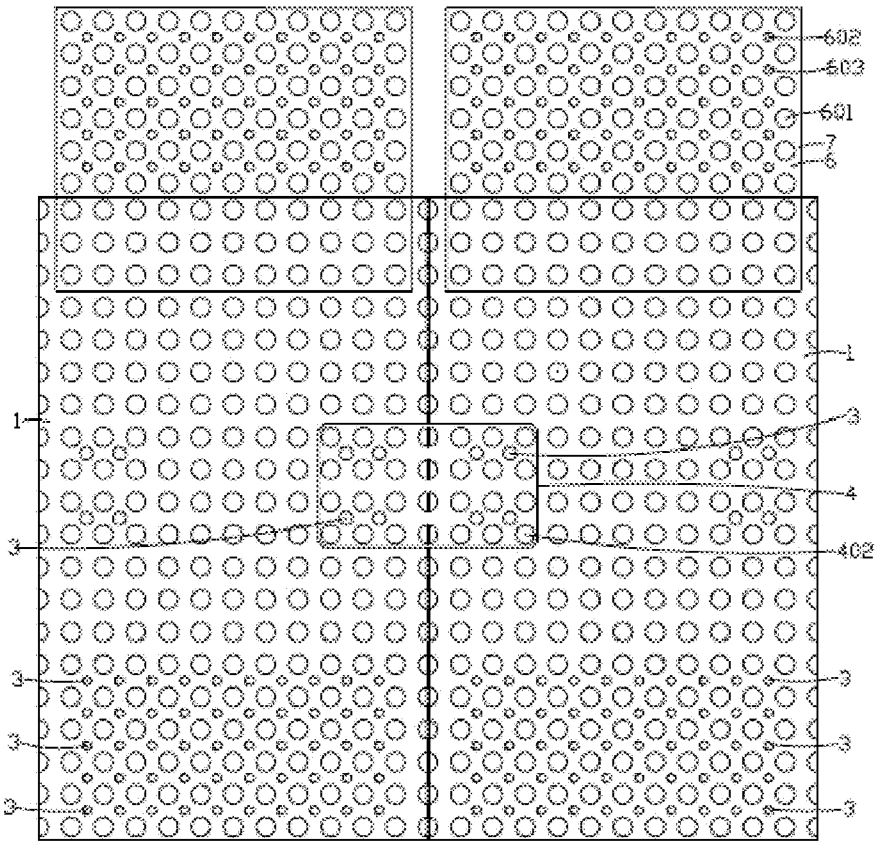
FIG. 2 is a schematic diagram of the left and right adjacent transparent screens being spliced.
Figure 7:
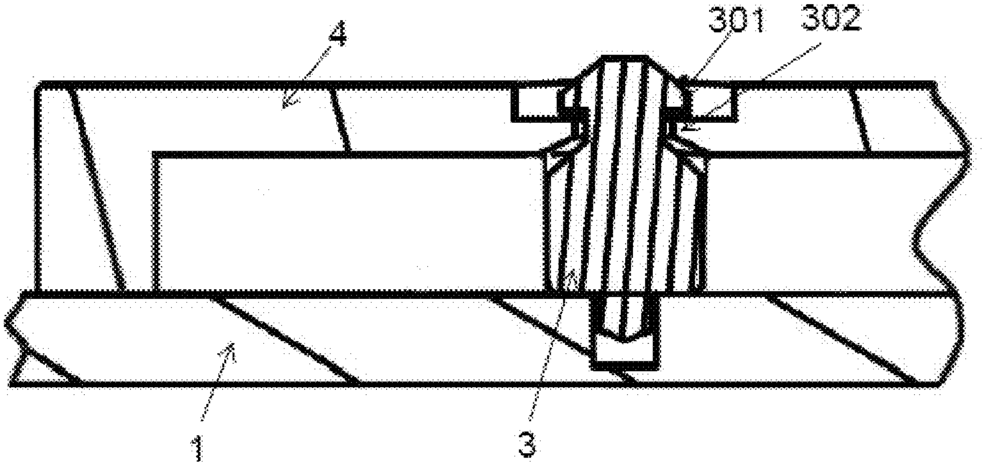
FIG. 7 is a cross-sectional view showing the connection between the first limiting plate and the first connecting column 3.
Figure 8:
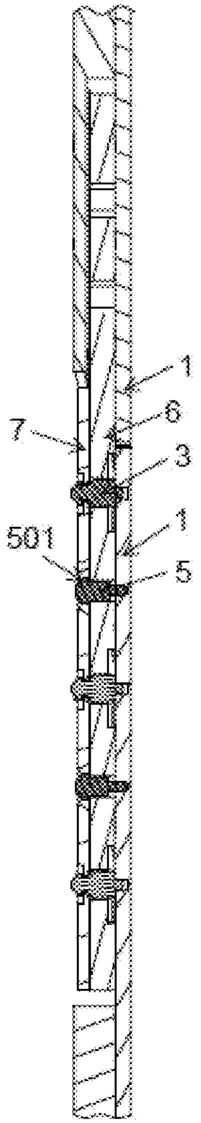
FIG. 8 is a cross-sectional view of the upper and lower adjacent transparent screens being spliced.
Figure 9:
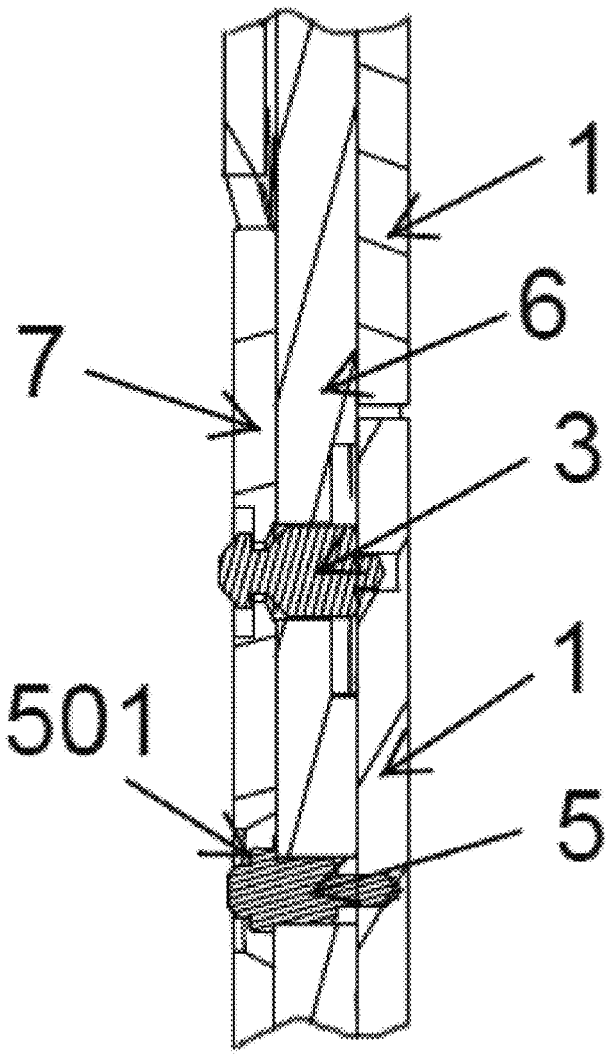
FIG. 9 is a cross-sectional view of the upper and lower adjacent transparent screens being spliced.

Referring to FIG. 1, FIG. 2 and FIG. 7, in some embodiments, the first connecting column 3 is mounted at the left end and/or the right end of the first circuit board 1 to facilitate the left and right adjacent transparent screens to be spliced. The transparent screen also includes a first limiting plate 4, the first limiting plate 4 is provided with a second through hole 401, and the second through hole 401 corresponds to the first through hole 101, to avoid the first limiting plate 4 blocking the first through hole 101 of the first circuit board 1, thereby reducing the transparency of the transparent screen. The first limiting plate 4 is provided with a first mounting hole 402. When two adjacent transparent screens provided on the left and right are spliced, the first connecting column 3 on the left side of one of the transparent screens is inserted into the first mounting hole 402, and the first limiting protrusion 301 abuts against the first limiting plate 4, to prevent the first connecting column 3 from being pulled out of the first mounting hole 402; the first connecting column 3 on the right side of the other transparent screen is inserted into the first mounting hole 402, and the first limiting protrusion 301 abuts against the first limiting plate 4, to prevent the first connecting column 3 from being pulled out of the first mounting hole 402. The first limiting plate 4 is used to realize the splicing of two adjacent transparent screens provided on the left and right, which is simple and convenient and does not affect the transparency of the transparent screen. In some embodiments, the first limiting plate 4 is made of insulating material. Preferably, the first limiting plate 4 is made of PC material. In some embodiments, the first mounting hole 402 is a T-shaped hole, and an aperture at one end close to the first circuit board 1 is smaller than an aperture at one end away from the first circuit board 1. The first connecting column 3 is provided with an annular groove 302, and the upper side wall of the groove is the first limiting protrusion 301. The first limiting plate 4 is stuck in the groove 302.

Here, the first mounting hole 402 is provided in a T-shape, so that the aperture gradually increases from one end near the first circuit board 1 to one end far away from the first circuit board 1, so that the first mounting hole 402 of the first limiting plate 4 is more firmly connected with the first connecting column 3.

In one preferable embodiment of the present application, the transparent screen consists of at least two identical first circuit board 1 arranged left and right, and the first limiting plate 4 is arranged on the second surface of the two first circuit boards 1, specifically at the joint of the two first circuit boards 1. The first connecting column 3 on the second surface of the two first circuit boards 1 is respectively inserted into the first mounting hole 402 on the left and right sides of the first limiting plate 4, to complete the left and right interlocking connection of the two first circuit boards 1, and the second through hole 401 on the first limiting plate 4 corresponds to the position of the first through hole 101. The aperture of the second through hole 401 is not less than the aperture of the first through hole 101, so as to ensure that the first limiting plate 4 does not affect the transparency of the first circuit board 1 when two first circuit boards 1 are connected on the left and right.

In addition, in the above embodiment, the first limiting protrusion 301 and the groove 302 are located at the end of the first connecting column 3 and the second connecting column 5 away from the first circuit board 1, the groove 302 is closer to the first circuit board 1, and the upper side wall of the groove 302 is the first limiting protrusion 301; when the first circuit board 1 is connected with the first limiting plate 4, the end of the first connecting column 3, namely the first limiting protrusion 301, passes through the first mounting hole 402 on the first limiting plate 4, so that the first limiting plate 4 is stuck in the groove 302, to ensure the reliability of the connection between the first circuit board 1 and the first limiting plate 4.

Referring to FIG. 1, FIG. 2, FIG. 8 and FIG. 9, in some embodiments, the transparent screen also includes a plurality of second connecting columns 5, the second connecting columns 5 is mounted on the mounting portion of the second surface; some of the second connecting columns 5 transmit electrical energy, and some of the second connecting columns 5 transmit signal; the second connecting column 5 has a second limiting protrusion 501. The first connecting column 3 and the second connecting column 5 are disposed at the lower end of the first circuit board 1. The transparent screen also includes a second circuit board 6, one end of the second circuit board 6 is welded to the first circuit board 1, and one end of the second circuit board 6 extends outside the first circuit board 1; the second circuit board 6 is electrical and signal conducting with the first circuit board 1; the second circuit board 6 is provided with a third through hole 601, and the third through hole 601 corresponds to the first through hole 101, so as to avoid the second circuit board 6 affecting the transparency of the first circuit board 1 when splicing. The second circuit board 6 is provided with a second accommodating hole 602 and a third mounting hole 603. When two adjacent transparent screens provided up and down are spliced, the second circuit board 6 at the upper end of one transparent screen is connected to the first connecting column 3 and the second connecting column 5 at the lower end of the other transparent screen, thereby achieving connection and electrical and signal conduction between the two adjacent transparent screens provided up and down. Specifically, the first connecting column 3 is able to be inserted into the second accommodating hole 602; the second connecting column 5 is able to be inserted into the third mounting hole 603, and the second limiting protrusion 501 abuts against the second circuit board 6, so that electrical and signal conduction is achieved between the two adjacent transparent screens provided upper and lower. In order to make the connection between the two transparent screens more stable, a second limiting plate 7 may be added to the side of the second circuit board 6 away from the first circuit board 1, and the second limiting plate 7 is provided with a fourth through hole, and the fourth through hole corresponds to the first through hole 101; the second limiting plate 7 is provided with a fourth mounting hole and a fifth accommodating hole, the first connecting column 3 passes through the third mounting hole 603 and extends into the fourth mounting hole, and the first limiting protrusion 301 abuts against the second limiting plate 7, to prevent the first connecting column 3 from being pulled out of the second limiting plate 7. The fifth accommodating hole corresponds to the second connecting column 5. In some embodiments, the second surface of the first circuit board 1 is provided with a carbon fiber board, and the carbon fiber board is provided with a hole corresponding to the first through hole 101. The provision of the carbon fiber plate may increase the strength of the transparent screen. At the welding place between the first circuit board 1 and the second circuit board 6, the carbon fiber board is provided with an accommodating groove, so that the second circuit board 6 is arranged between the first circuit board 1 and the carbon fiber board. The second connecting column 5 and the first connecting column 3 are arranged alternately in rows, that is, one row of first connecting column 3 and one row of second connecting column 5 are arranged alternately. The first connecting column 3 is provided with an annular groove 302, and the upper side wall of the groove is the first limiting protrusion 301. The second limiting plate 7 is stuck in the groove 302.

Here, the first connecting column 3 and the second connecting column 5 on the first circuit board 1 may be arranged only at the upper end, or only at the lower end, and of course may be both at the upper end and the lower end. For example, the transparent screen provided with the first connecting column 3 and the second connecting column 5 at the upper end may be extended upward and connected with another transparent screen provided with the first connecting column 3 and the second connecting column 5 at the lower end; the transparent screen provided with the first connecting column 3 and the second connecting column 5 at the lower end may be extended downward and connected with another transparent screen provided with the first connecting column 3 and the second connecting column 5 at the upper end; similarly, the transparent screen provided with the first connecting column 3 and the second connecting column 5 at both the upper and lower ends may be extended upward and downward at the same time, to connect with the other transparent screen above and below it. When the two transparent screens are connected, the second circuit board 6 at the upper end of one transparent screen is connected with the first connecting column 3 and the second connecting column 5 at the lower end of the other transparent screen, so that the electrical and signal conduction is achieved between the two adjacent transparent screens provided upper and lower.

In addition, by arranging the carbon fiber plate on the second surface of the first circuit board 1, the strength of the first circuit board 1 may be increased, so that the transparent screen may realize in a large area; the carbon fiber plate is provided with a hole corresponding to the first through hole 101 on the first circuit board 1, and these holes are also through holes, and the aperture shall not be less than the aperture of the first through hole 101, so as to ensure that the transparent screen has better transparency; as well as the carbon fiber plate is also provided with an accommodating groove, the accommodating groove is specifically arranged at a position welding the first circuit board 1 and the second circuit board 6, so as to ensure that the second circuit board 6 may be arranged between the first circuit board 1 and the carbon fiber plate, to ensure the smooth of the transparent screen.

In addition, in the above embodiment, the first limiting protrusion 301 and the groove 302 are located at the end of the first connecting column 3 away from the first circuit board 1, and the second limiting protrusion 501 is located at the end of the second connecting column 5 away from the first circuit board 1, the second limiting protrusion 501 of the second connection column 5 is capable of inserting and passing through the third mounting hole 603 of the second circuit board 6, so that the second limiting protrusion 501 abuts against the second circuit board 6; at the welding place between the first circuit board 1 and the second circuit board 6, the end of the first connecting column 3 and the second connecting column 5, namely the first limiting protrusion 301 and the second limiting protrusion 501, will pass through the second circuit board 6, so that the second limiting plate 7 is stuck in the groove 302 of the first connecting column 3, and the second limiting protrusion 501 of the second connection column 5 abuts against the second limiting plate 7, to ensure the reliability of the connections of the first circuit board 1 and the second circuit board 6 with the first limiting plate 7.

Figure 3:
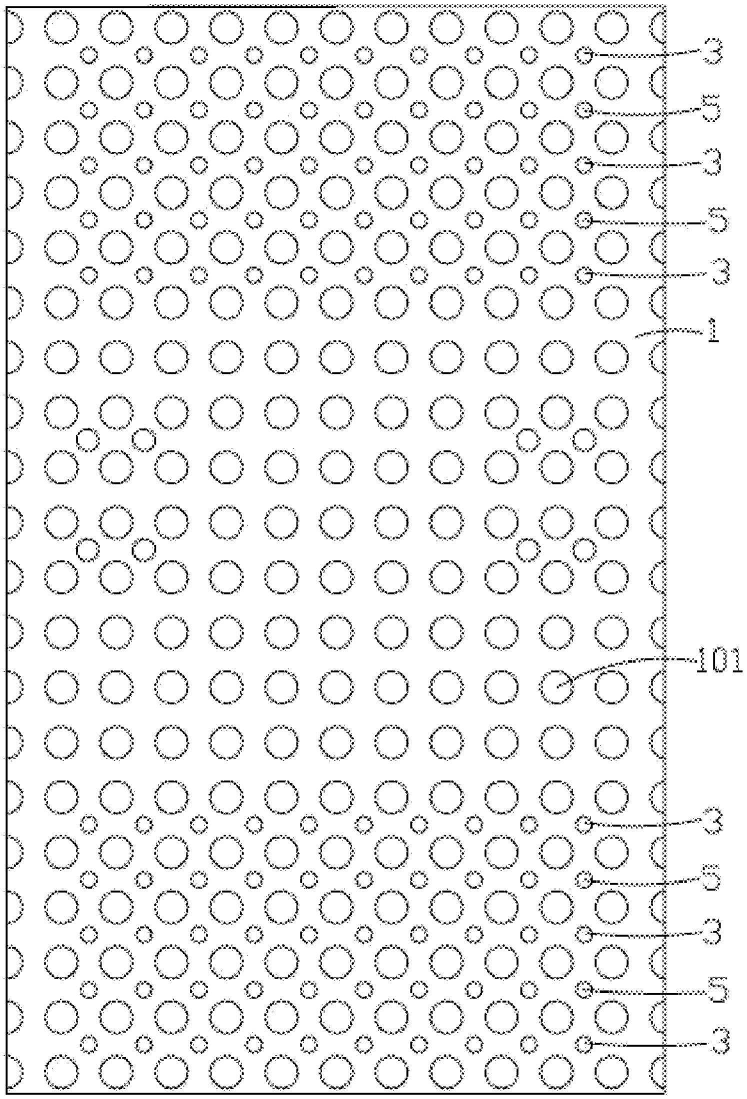
FIG. 3 is a schematic diagram of an embodiment of a transparent screen.
Figure 4:
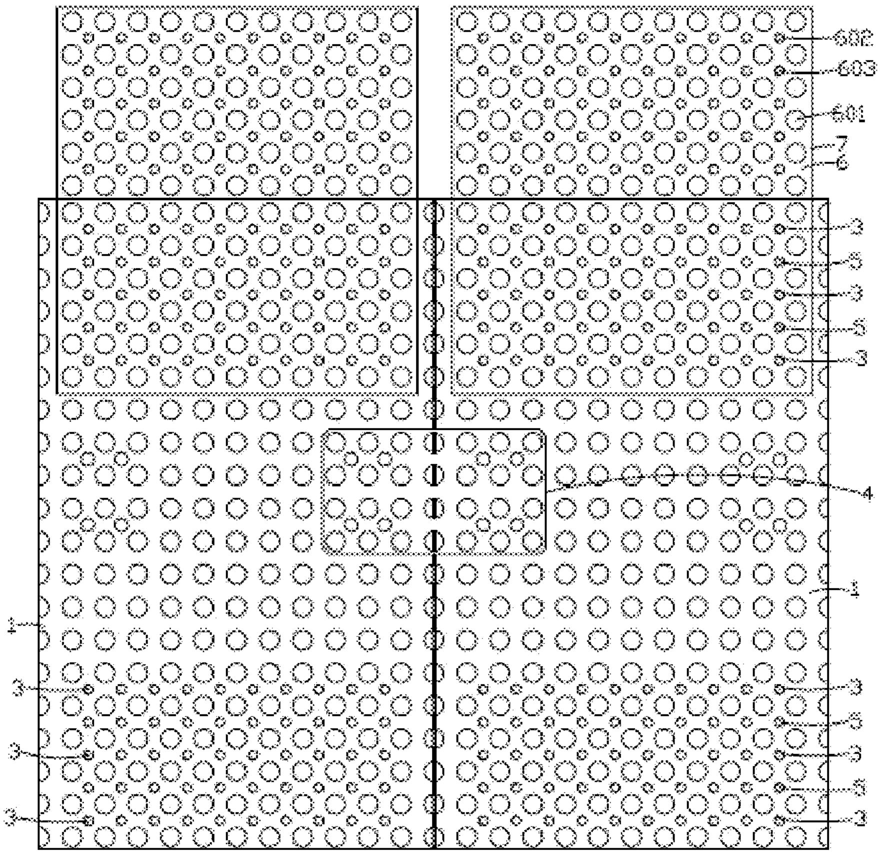
FIG. 4 is a schematic diagram of the left and right adjacent transparent screens being spliced.

Referring to FIG. 3 and FIG. 4, in some embodiments, the transparent screen also includes a plurality of second connecting columns 5, the second connecting column 5 is mounted on the mounting portion of the second surface; some of the second connecting columns 5 transmit electrical energy, and some of the second connecting columns 5 transmit signals; the second connecting column 5 has a second limiting protrusion 501. The first connecting column 3 and the second connecting column 5 are disposed at the upper end and the lower end of the first circuit board 1. The transparent screen further includes a second circuit board 6, the second circuit board 6 is provided with a third through hole 601, and the third through hole 601 corresponds to the first through hole 101; the second circuit board 6 is provided with a second accommodating hole 602 and a third mounting hole 603. When two adjacent transparent screens provided up and down are spliced, the first connecting column 3 and the second connecting column 5 at the lower end of one of the transparent screens are connected to the second circuit board 6, and the first connecting column 3 and the second connecting column 5 at the upper end of the other transparent screen are connected to the second circuit board 6, thereby achieving connection and electrical and signal conduction between the two adjacent transparent screens provided up and down. Specifically, the first connecting column 3 of two adjacent transparent screens provided up and down is inserted into the second accommodating hole 602; the second connecting column 5 of two adjacent transparent screens provided up and down May be inserted into the third mounting hole 603, and the second limiting protrusion 501 abuts against the second circuit board 6, so that the electrical and signal two adjacent transparent screens provided up and down are conducted. In order to make the connection between the two transparent screens more stable, a second limiting plate 7 may be added to the side of the second circuit board 6 away from the first circuit board 1, and the second limiting plate 7 is provided with a fourth through hole, and the fourth through hole corresponds to the first through hole 101; the second limiting plate 7 is provided with a fourth mounting hole and a fifth accommodating hole, the first connecting column 3 passes through the third mounting hole 603 and extends into the fourth mounting hole, and the first limiting protrusion 301 abuts against the second limiting plate 7, to prevent the first connecting column 3 from being pulled out of the second limiting plate 7. The fourth mounting hole coincides with the third mounting hole. In some embodiments, the fourth mounting hole is a T-shaped hole, and an aperture at one end close to the first circuit board 1 is smaller than an aperture at one end away from the first circuit board 1. The fifth accommodating hole corresponds to the second connecting column 5.

In some embodiments, the first connecting column 3 is a copper column, which is fixed to the first circuit board 1 by welding. Of course, the first connecting column 3 may also be in other forms. For example, the first connecting column 3 may be bonded to the circuit board with glue, or may be threadedly connected to the circuit board. The second connecting column 5 is a spring pin. Specifically, the second connecting column 5 is a pogopin spring pin.

In some embodiments, the first connecting column 3 is mounted at the upper end and/or the lower end of the first circuit board 1; some of the first connecting columns 3 transmit electrical energy, and some of the first connecting columns 3 transmit signal; the transparent screen also includes a second circuit board 6, and the second circuit board 6 is provided with a third through hole 601, and the third through hole 601 corresponds to the first through hole 101; the second circuit board 6 is provided with a second accommodating hole 602, and when two adjacent transparent screens provided up and down are spliced, the first connecting column 3 at the lower end of one of the transparent screens is connected to the second circuit board 6, and the first connecting column 3 at the upper end of the other transparent screen is connected to the second circuit board 6, thereby realizing the connection and the electrical and signal conduction of the two adjacent transparent screens provided up and down. Specifically, the first connecting column 3 of two adjacent transparent screens provided up and down is inserted into the second accommodating hole 602, and the first limiting protrusion 301 abuts against the second circuit board 6, thereby achieving the connection and the electrical and signal conduction of the two adjacent transparent screens provided up and down.

The above description is only a preferred embodiment of the present application and is not intended to limit the present application. Any modifications, equivalent substitutions and improvements made within the spirit and principles of the present application should be included in the protection scope of the present application.

What is claimed is:

1. A transparent screen, comprising:

a first circuit board and an LED lamp bead, wherein the first circuit board has a first surface and a second surface opposite to the first surface; the first circuit board comprises a transparent portion provided with several first through holes penetrating the first circuit board and a mounting portion without through holes, and the LED lamp bead is mounted on the mounting portion of the first surface; and a plurality of first connecting columns, mounted on the mounting portion of the second surface; wherein the first connecting column has a first limiting protrusion.

2. The transparent screen according to claim 1, wherein the first connecting column is mounted at a left end of the first circuit board, or the first connecting column is mounted at a right end of the first circuit board, or the first connecting column is mounted at both the left end of the first circuit board and the right end of the first circuit board.

3. The transparent screen according to claim 2, further comprising a first limiting plate, wherein the first limiting plate is provided with a first mounting hole, the first connecting column is inserted into the first mounting hole, and the first limiting protrusion abuts against the first limiting plate; and the first limiting plate is provided with a second through hole, and the second through hole corresponds to the first through hole.

4. The transparent screen according to claim 1, further comprising a plurality of second connecting columns, wherein the second connecting column is mounted on the mounting portion of the second surface; some of the second connecting columns transmit electrical energy, and some of the second connecting columns transmit signal; and the second connecting column has a second limiting protrusion.

5. The transparent screen according to claim 4, wherein the plurality of second connecting columns forms a plurality of second connecting column rows, the plurality of first connecting columns forms a plurality of first connecting column rows, and the second connecting column rows and the first connecting column rows are provided alternatively.

6. The transparent screen according to claim 4, wherein the first connecting column and the second connecting column are provided at a lower end of the first circuit board;

the transparent screen further comprises a second circuit board, one end of the second circuit board is welded to the first circuit board, and one end of the second circuit board extends outside the first circuit board; the second circuit board is electrical and signal conductive with the first circuit board; the second circuit board is provided with a third through hole, and the third through hole corresponds to the first through hole; the second circuit board is provided with a second accommodating hole and a third mounting hole, and the first connecting column is able to be inserted into the second accommodating hole; and the second connecting column is able to be inserted into the third mounting hole, and the second limiting protrusion abuts against the second circuit board.

7. The transparent screen according to claim 4, wherein the first connecting column and the second connecting column are provided at an upper end of the first circuit board, or the first connecting column and the second connecting column are provided at a lower end of the first circuit board, or the first connecting column and the second connecting column are provided at both an upper end of the first circuit board and a lower end of the first circuit board;

the transparent screen further comprises a second circuit board, the second circuit board is provided with a third through hole, and the third through hole corresponds to the first through hole; the second circuit board is provided with a second accommodating hole and a third mounting hole, and the first connecting column is able to be inserted into the second accommodating hole; and the second connecting column is able to be inserted into the third mounting hole, and the second limiting protrusion abuts against the second circuit board.

8. The transparent screen according to claim 6, further comprising a second limiting plate, the second limiting plate is provided with a fourth through hole, and the fourth through hole corresponds to the first through hole; the second limiting plate is provided with a fourth mounting hole and a fifth accommodating hole, the first connecting column passes through the third mounting hole and extends into the fourth mounting hole, and the first limiting protrusion abuts against the second limiting plate; and the fifth accommodating hole corresponds to the second connecting column.

9. The transparent screen according to claim 1, wherein the first connecting column is mounted on an upper end of the first circuit board, or the first connecting column is mounted on a lower end of the first circuit board, or the first connecting column is mounted on both an upper end of the first circuit board and a lower end of the first circuit board; some of the first connecting columns transmit electrical energy, and some of the first connecting columns transmit signal;

the transparent screen further comprises a second circuit board, the second circuit board is provided with a third through hole, and the third through hole corresponds to the first through hole;

the second circuit board is provided with a second accommodating hole, the first connecting column is inserted into the second accommodating hole, and the first limiting protrusion abuts against the second circuit board, to realize the transmission of electric energy and signal between the first circuit board and the second circuit board.

10. The transparent screen according to claim 1, wherein the first connecting column is provided with an annular groove, and an upper side wall of the groove is the first limiting protrusion.

11. The transparent screen according to claim 3, wherein the first mounting hole is a T-shaped hole, and an aperture near one end of the first circuit board is smaller than an aperture away from the first circuit board.

12. The transparent screen according to claim 3, wherein the first limiting plate is provided at a joint of the second surface of two identical first circuit boards being provided left and right, the second through hole corresponds to a position of the first through hole, and an aperture of the second through hole is not less than an aperture of the first through hole.

13. The transparent screen according to claim 6, wherein the first connecting column is a copper column, being welded and fixed with the first circuit board; and the second connecting column is a pogopin spring needle.

14. The transparent screen according to claim 6, wherein the second surface of the first circuit board is provided with a carbon fiber plate, and the carbon fiber plate is provided with a hole corresponding to the first through hole; the carbon fiber plate is provided with an accommodating groove at a position welding the first circuit board and the second circuit board.

15. The transparent screen according to claim 2, further comprising a plurality of second connecting columns, wherein the second connecting column is mounted on the mounting portion of the second surface; some of the second connecting columns transmit electrical energy, and some of the second connecting columns transmit signal; and the second connecting column has a second limiting protrusion.

16. The transparent screen according to claim 3, further comprising a plurality of second connecting columns, wherein the second connecting column is mounted on the mounting portion of the second surface; some of the second connecting columns transmit electrical energy, and some of the second connecting columns transmit signal; and the second connecting column has a second limiting protrusion.

17. The transparent screen according to claim 7, further comprising a second limiting plate, the second limiting plate is provided with a fourth through hole, and the fourth through hole corresponds to the first through hole; the second limiting plate is provided with a fourth mounting hole and a fifth accommodating hole, the first connecting column passes through the third mounting hole and extends into the fourth mounting hole, and the first limiting protrusion abuts against the second limiting plate; and the fifth accommodating hole corresponds to the second connecting column.

18. The transparent screen according to claim 2, wherein the first connecting column is mounted on an upper end of the first circuit board, or the first connecting column is mounted on a lower end of the first circuit board, or the first connecting column is mounted on both an upper end of the first circuit board and a lower end of the first circuit board; some of the first connecting columns transmit electrical energy, and some of the first connecting columns transmit signal;

the transparent screen further comprises a second circuit board, the second circuit board is provided with a third through hole, and the third through hole corresponds to the first through hole;

the second circuit board is provided with a second accommodating hole, the first connecting column is inserted into the second accommodating hole, and the first limiting protrusion abuts against the second circuit board, to realize the transmission of electric energy and signal between the first circuit board and the second circuit board.

19. The transparent screen according to claim 3, wherein the first connecting column is mounted on an upper end of the first circuit board, or the first connecting column is mounted a lower end of the first circuit board, or the first connecting column is mounted on both an upper end of the first circuit board and a lower end of the first circuit board; some of the first connecting columns transmit electrical energy, and some of the first connecting columns transmit signal;

the transparent screen further comprises a second circuit board, the second circuit board is provided with a third through hole, and the third through hole corresponds to the first through hole;

the second circuit board is provided with a second accommodating hole, the first connecting column is inserted into the second accommodating hole, and the first limiting protrusion abuts against the second circuit board, to realize the transmission of electric energy and signal between the first circuit board and the second circuit board.

* * * * *